United States Patent
Szabo et al.

(10) Patent No.: US 8,463,909 B1
(45) Date of Patent: Jun. 11, 2013

(54) SYSTEMS AND METHODS FOR MANAGING SERVER RESOURCES

(75) Inventors: Paul I. Szabo, Shoreline, WA (US); Nat Thirasuttakorn, Seattle, WA (US); Benn Bollay, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 95 days.

(21) Appl. No.: 12/882,836

(22) Filed: Sep. 15, 2010

(51) Int. Cl.
*G06F 15/173* (2006.01)
*H04Q 11/00* (2006.01)

(52) U.S. Cl.
USPC ........... 709/226; 370/412; 370/413; 370/414; 370/415; 370/416; 370/417; 370/418

(58) Field of Classification Search
USPC .................. 709/226, 217, 218, 219; 370/412, 370/413, 414, 415, 416, 417, 418
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |

(Continued)

FOREIGN PATENT DOCUMENTS

| | | |
|---|---|---|
| EP | 744850 A2 | 11/1996 |
| EP | 1604283 A2 * | 12/2005 |

(Continued)

OTHER PUBLICATIONS

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

(Continued)

*Primary Examiner* — Hassan Kizou
*Assistant Examiner* — Deepa Belur
(74) *Attorney, Agent, or Firm* — LeClairRyan, a Professional Corporation

(57) ABSTRACT

A method, computer readable medium, and apparatus for managing server resources includes receiving at a traffic management device one or more requests in a message based protocol. The traffic management device determines a difference between a level of utilization of resources maintained by a server that handles the one or more received requests and a threshold level of utilization of resources that can be maintained by the server; and randomly delays the one or more requests based upon the determined difference.

33 Claims, 4 Drawing Sheets

U.S. PATENT DOCUMENTS

| | | | |
|---|---|---|---|
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,790,554 A | 8/1998 | Pitcher et al. | |
| 5,802,052 A | 9/1998 | Venkataraman | |
| 5,812,550 A | 9/1998 | Sohn et al. | |
| 5,825,772 A | 10/1998 | Dobbins et al. | |
| 5,875,296 A | 2/1999 | Shi et al. | |
| 5,892,914 A | 4/1999 | Pitts | |
| 5,892,932 A | 4/1999 | Kim | |
| 5,919,247 A | 7/1999 | Van Hoff et al. | |
| 5,936,939 A | 8/1999 | Des Jardins et al. | |
| 5,941,988 A | 8/1999 | Bhagwat et al. | |
| 5,946,690 A | 8/1999 | Pitts | |
| 5,949,885 A | 9/1999 | Leighton | |
| 5,951,694 A | 9/1999 | Choquier et al. | |
| 5,959,990 A | 9/1999 | Frantz et al. | |
| 5,974,460 A | 10/1999 | Maddalozzo, Jr. et al. | |
| 5,983,281 A | 11/1999 | Ogle et al. | |
| 6,006,260 A | 12/1999 | Barrick, Jr. et al. | |
| 6,006,264 A | 12/1999 | Colby et al. | |
| 6,026,452 A | 2/2000 | Pitts | |
| 6,028,857 A | 2/2000 | Poor | |
| 6,051,169 A | 4/2000 | Brown et al. | |
| 6,078,956 A | 6/2000 | Bryant et al. | |
| 6,085,234 A | 7/2000 | Pitts et al. | |
| 6,092,196 A | 7/2000 | Reiche | |
| 6,108,703 A | 8/2000 | Leighton et al. | |
| 6,111,876 A | 8/2000 | Frantz et al. | |
| 6,128,279 A | 10/2000 | O'Neil et al. | |
| 6,128,657 A | 10/2000 | Okanoya et al. | |
| 6,170,022 B1 * | 1/2001 | Linville et al. | 710/29 |
| 6,178,423 B1 | 1/2001 | Douceur et al. | |
| 6,182,139 B1 | 1/2001 | Brendel | |
| 6,192,051 B1 | 2/2001 | Lipman et al. | |
| 6,233,612 B1 | 5/2001 | Fruchtman et al. | |
| 6,246,684 B1 | 6/2001 | Chapman et al. | |
| 6,253,226 B1 | 6/2001 | Chidambaran et al. | |
| 6,253,230 B1 | 6/2001 | Couland et al. | |
| 6,263,368 B1 | 7/2001 | Martin | |
| 6,289,012 B1 | 9/2001 | Harrington et al. | |
| 6,298,380 B1 | 10/2001 | Coile et al. | |
| 6,327,622 B1 | 12/2001 | Jindal et al. | |
| 6,343,324 B1 | 1/2002 | Hubis et al. | |
| 6,347,339 B1 | 2/2002 | Morris et al. | |
| 6,360,270 B1 | 3/2002 | Cherkasova et al. | |
| 6,374,300 B2 | 4/2002 | Masters | |
| 6,396,833 B1 | 5/2002 | Zhang et al. | |
| 6,484,261 B1 | 11/2002 | Wiegel | |
| 6,490,624 B1 | 12/2002 | Sampson et al. | |
| 6,510,135 B1 | 1/2003 | Almulhem et al. | |
| 6,519,643 B1 | 2/2003 | Foulkes et al. | |
| 6,601,084 B1 | 7/2003 | Bhaskaran et al. | |
| 6,636,503 B1 | 10/2003 | Shiran et al. | |
| 6,636,894 B1 | 10/2003 | Short et al. | |
| 6,650,640 B1 | 11/2003 | Muller et al. | |
| 6,650,641 B1 | 11/2003 | Albert et al. | |
| 6,654,701 B2 | 11/2003 | Hatley | |
| 6,691,165 B1 | 2/2004 | Bruck et al. | |
| 6,708,187 B1 | 3/2004 | Shanumgam et al. | |
| 6,742,045 B1 | 5/2004 | Albert et al. | |
| 6,751,663 B1 | 6/2004 | Farrell et al. | |
| 6,754,228 B1 | 6/2004 | Ludwig | |
| 6,760,775 B1 | 7/2004 | Anerousis et al. | |
| 6,772,219 B1 | 8/2004 | Shobatake | |
| 6,779,039 B1 | 8/2004 | Bommareddy et al. | |
| 6,781,986 B1 | 8/2004 | Sabaa et al. | |
| 6,798,777 B1 | 9/2004 | Ferguson et al. | |
| 6,816,901 B1 | 11/2004 | Sitaraman et al. | |
| 6,829,238 B2 | 12/2004 | Tokuyo et al. | |
| 6,868,082 B1 | 3/2005 | Allen, Jr. et al. | |
| 6,876,629 B2 | 4/2005 | Beshai et al. | |
| 6,876,654 B1 | 4/2005 | Hegde | |
| 6,888,836 B1 | 5/2005 | Cherkasova | |
| 6,928,082 B2 | 8/2005 | Liu et al. | |
| 6,950,434 B1 | 9/2005 | Viswanath et al. | |
| 6,954,780 B2 | 10/2005 | Susai et al. | |
| 6,957,272 B2 | 10/2005 | Tallegas et al. | |
| 6,975,592 B1 | 12/2005 | Seddigh et al. | |
| 7,007,092 B2 | 2/2006 | Peiffer | |
| 7,139,792 B1 | 11/2006 | Mishra et al. | |
| 7,321,926 B1 | 1/2008 | Zhang et al. | |
| 7,343,413 B2 | 3/2008 | Gilde et al. | |
| 7,349,391 B2 | 3/2008 | Ben-Dor et al. | |
| 7,428,586 B2 * | 9/2008 | Sutherland et al. | 709/224 |
| 7,490,162 B1 | 2/2009 | Masters | |
| 7,558,197 B1 * | 7/2009 | Sindhu et al. | 370/230 |
| 8,130,650 B2 * | 3/2012 | Allen et al. | 370/235 |
| 2001/0023442 A1 | 9/2001 | Masters | |
| 2002/0059428 A1 | 5/2002 | Susai et al. | |
| 2002/0161913 A1 | 10/2002 | Gonzalez et al. | |
| 2002/0198993 A1 | 12/2002 | Cudd et al. | |
| 2003/0046291 A1 | 3/2003 | Fascenda | |
| 2003/0086415 A1 | 5/2003 | Bernhard et al. | |
| 2003/0225485 A1 | 12/2003 | Fritz et al. | |
| 2005/0122977 A1 | 6/2005 | Lieberman | |
| 2005/0187866 A1 | 8/2005 | Lee | |
| 2006/0059267 A1 | 3/2006 | Cugi et al. | |
| 2007/0083646 A1 | 4/2007 | Miller et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2008/0133518 A1 | 6/2008 | Kapoor et al. | |
| 2008/0244061 A1 * | 10/2008 | Kime | 709/224 |
| 2009/0049230 A1 | 2/2009 | Pandya | |
| 2009/0141891 A1 | 6/2009 | Boyen et al. | |
| 2009/0287935 A1 | 11/2009 | Aull et al. | |
| 2010/0122091 A1 | 5/2010 | Huang et al. | |
| 2010/0325277 A1 * | 12/2010 | Muthiah et al. | 709/226 |

FOREIGN PATENT DOCUMENTS

| | | |
|---|---|---|
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

"A Process for Selective Routing of Servlet Content to Transcoding Modules," Research Disclosure 422124, IBM Corporation, pp. 889-890, Jun. 1999. (2 pages).

"Servlet/Applet/HTML Authentication Process With Single Sign-On," Research Disclosure 429128, IBM Corporation, pp. 163-164, Jan. 2000. (2 pages).

Floyd et al., "Random Early Detection Gateways for Congestion Avoidance," Aug. 1993, pp. 1-22, IEEE/ACM Transactions on Networking, California.

MacVittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

Raghavan B., et al., "Cloud Control with Distributed Rate Limiting", SIGCOMM'07, Aug. 27-31, 2007, pp. 1-11, Department of Computer Science and Engineering, University of California, San Diego, CA.

Snoeren A., et al., "Managing Cloud Resources:Distributed Rate Limited", Building and Programming the Cloud Workshop, Jan. 13, 2010, pp. 1-38, UCSDCSE Computer Science and Engineering.

* cited by examiner

SYSTEMS AND METHODS FOR MANAGING SERVER RESOURCES

TECHNOLOGICAL FIELD

This technology generally relates to managing network traffic, and more particularly, to systems and methods for managing server resources.

BACKGROUND

Conventional technologies for server resource management for message-based protocols like Hypertext Transfer Protocol (HTTP) sequentially queue requests coming from clients for a limited time when no server side connections are available for those requests. Unfortunately, such sequential queuing is unfair in terms of its application to client requests as and when they arrive, and provides a crude back-off resulting in dropped packets. Further, conventional technologies do not provide any prioritization at the point when a decision to form the queue is made leading to delay of critical network traffic. Furthermore, conventional technologies impose an unfair delay using a traditional "cliff" threshold and do not take into account the fact that newer connections coming in could take priority over the delayed connections.

SUMMARY

One example of the technology is a method for managing server resources. The method includes receiving at a traffic management device one or more requests in a message based protocol. The traffic management device determines a difference between a level of utilization of resources maintained by a server that handles the one or more received requests and a threshold level of utilization of resources that can be maintained by the server, and randomly delays the one or more requests based upon the determined difference.

Another example includes a computer readable medium having stored thereon instructions for managing server resources, which when executed by at least one processor, causes the processor to perform a number of steps. The steps include receiving at a traffic management device one or more requests in a message based protocol. The traffic management device determines a difference between a level of utilization of resources maintained by a server that handles the one or more received requests and a threshold level of utilization of resources that can be maintained by the server, and randomly delays the one or more requests based upon the determined difference.

Another example is that of a traffic management device, which includes one or more processors executing one or more traffic management applications, a memory, a network interface controller coupled to the one or more processors and the memory and configured to receive data packets from a network that relate to the executing traffic management applications, and manage server resources. In this example, at least one of the one or more processors and the network interface controller include logic capable of being further configured to implement receiving at a traffic management device one or more requests in a message based protocol. The traffic management device determines a difference between a level of utilization of resources maintained by a server that handles the one or more received requests and a threshold level of utilization of resources that can be maintained by the server, and randomly delays the one or more requests based upon the determined difference.

The examples offer numerous advantages. By way of example only, the technology accomplishes queuing by analyzing how close to a "no connections available" threshold a pool of servers managed by a traffic management device is, and randomly queuing requests proportional to the threshold of maximum connection count. Advantageously, this provides a smoother back-off response and more fairness. Further, rather than strictly queue the requests, the technology randomly delays the client requests, either on the traffic management device box or taking advantage of methods available in the Layer 7 protocol (e.g., HTTP using "retry after" message). The delay performed by the technology is fair since it is not just performing a traditional "cliff" threshold (because newer connections coming in would take priority over the delayed connections), but adding random early delay (RED) algorithms to network requests, as new connections would be getting delayed in the same proportion. Advantageously, this technology implements algorithms to randomly delay or queue client HTTP requests, or other types of message-based protocol requests, when a pool of servers approaches a threshold of maximum allowed connections, or other thresholds of allowed resource utilization.

DETAILED DESCRIPTION

Figure 1:
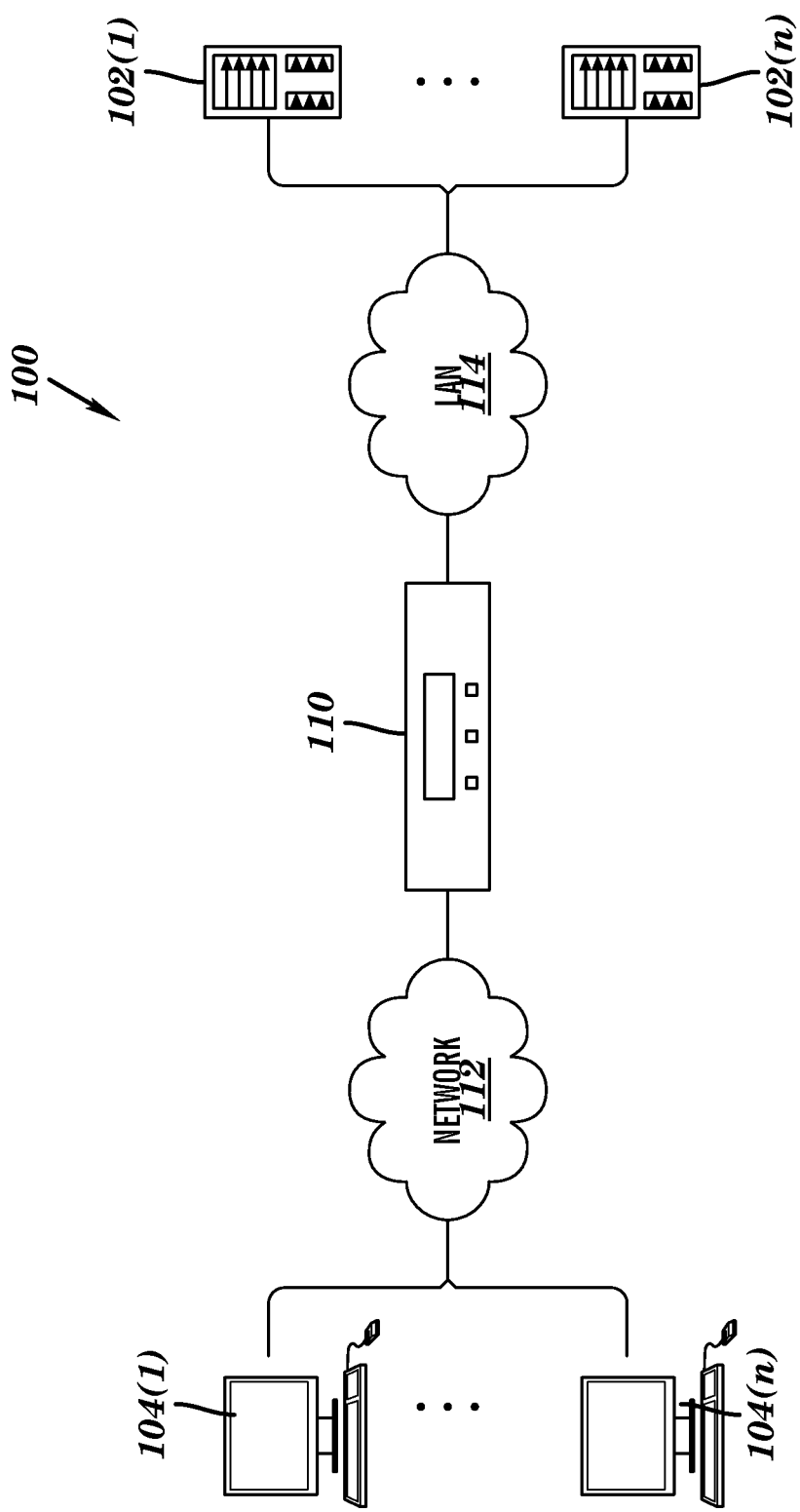
FIG. 1 illustrates an exemplary network system environment using traffic management device for managing server resources.

Referring to FIG. 1, an exemplary network system 100 including a traffic management device 110 that can manage server resources. By way of example only, a network 112 can provide responses and requests according to the Hyper-Text Transfer Protocol (HTTP) based application, request for comments (RFC) protocol or the Common Internet File System (CIFS) or network file system (NFS) protocol in this example, although the principles discussed herein are not limited to these examples and can include other application protocols and other types of requests (e.g., File Transfer Protocol (FTP) based requests). The exemplary network system 100 can include a series of one or more client devices such as client computers 104(1) to 104(n). Client computers 104(1)-104(n) are coupled to traffic management device 110 interposed in between servers 102(1) to 102(n) and the client devices 104(1) to 104(n) for providing one or more communication channels through network 112 and a Local Area Network (LAN) 114, although other communication channel may be directly established between various devices in network system 100 without network 112 and/or LAN 114. For clarity and brevity, in FIG. 1 two server devices 102(1) and 102(n) are shown, but it should be understood that any number of server devices can use the exemplary network system 100. Likewise, two client devices 104(1)-104(n) and one traffic management device 110 are shown in FIG. 1, but any number of client devices and traffic management devices can also use the exemplary network system 100 as well. Although network 112 and LAN 114 are shown, other numbers and types of networks could be used. The ellipses and the designation "n" denote an unlimited number of server devices and client devices, respectively.

Servers 102(1)-102(n) comprise one or more server computing machines or devices capable of operating one or more Web-based applications that may be accessed by network devices in the network 112, such as client computers 104(1)-104(n) (also referred to as client devices 104(1)-104(n)), via traffic management device 110, and may provide other data representing requested resources, such as particular Web page(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1, other numbers and types of servers may be coupled to the traffic management device 110. It is also contemplated that one or more of the servers 102(1)-102(n) may be a cluster of servers managed by a network traffic management device such as traffic management device 110.

The client computers 104(1)-104(n) in this example (also interchangeably referred to as client devices, client computing devices, and client computing systems) can run interface applications such as Web browsers that can provide an interface to make requests for and send data to different Web server-based applications via the network 112 and via traffic management device 110. A series of network applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). For example, as per the Transmission Control Protocol (TCP), packets can be sent to the servers 102(1)-102(n) from the requesting client computers 104(1)-104(n) to send data, although other protocols (e.g., FTP) may be used. It is to be understood that the servers 102(1)-102(n) can be hardware or software or can represent a system with multiple servers, which can include internal or external networks. In this example, the servers 102(1)-102(n) can be any version of Microsoft® IIS servers or Apache® servers, although other types of servers can be used. Further, additional servers can be coupled to the network 112 and/or LAN 114 and many different types of applications can be available on servers coupled to the network 112 and/or LAN 114.

Generally, the client devices such as the client computers 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run browsers and other types of applications (e.g., web-based applications) that can provide an interface to make one or more requests to different server-based applications via the network 112, although requests for other types of network applications may be made by the client computers 104(1)-104(n).

A series of Web-based and/or other types of protected and unprotected network applications can run on the application servers 102(1)-102(n) that allow the transmission of data that is requested by the client computers 104(1)-104(n). The client computers 104(1)-104(n) can be further configured to engage in a secure communication with the traffic management device 110 and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, such as the Internet, which includes client computers 104(1)-104(n), although the network 112 may comprise other types of private and public networks that include other devices. Communications, such as requests from client computers 104(1)-104(n) and responses from servers 102(1)-102(n), take place over the network 112 according to standard network protocols, such as the HTTP and TCP/IP protocols in this example, but the principles discussed herein are not limited to this example and can include other protocols (e.g., FTP). Further, the network 112 can include local area networks (LANs), wide area networks (WANs), direct connections, other types and numbers of network types, and any combination thereof. On an interconnected set of LANs or other networks, including those based on different architectures and protocols, routers, switches, hubs, gateways, bridges, crossbars, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links, optical fibers, and other communications links known to those skilled in the relevant arts. In essence, the network 112 includes any communication medium and method by which data may travel between client devices 104(1)-104(n), servers 102(1)-102(n), and traffic management device 110, and these devices are provided by way of example only.

In this example, each of the servers 102(1)-102(n), traffic management device 110, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of cloud computing and/or distributed processing, such as redundancy, replication, virtualization, and the like, can also be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDN5), the Internet, intranets, combination(s) thereof, and the like.

By way of example only and not by way of limitation, LAN 114 comprises a private local area network that includes the traffic management device 110 coupled to the one or more servers 102(1)-102(n), although the LAN 114 may comprise other types of private and public networks with other devices. Networks, including local area networks, besides being understood by those of ordinary skill in the relevant art(s), have already been described above in connection with network 112, and thus will not be described further here.

As shown in the example environment of network system 100 depicted in FIG. 1, the traffic management device 110 can be interposed between the network 112 and the servers 102(1)-102(n) coupled via LAN 114 as shown in FIG. 1. Again, the network system 100 could be arranged in other manners with other numbers and types of devices. Also, the traffic management device 110 is coupled to network 112 by one or more network communication links, and intermediate network devices, such as routers, switches, gateways, hubs, crossbars, and other devices (not shown). It should be understood that the devices and the particular configuration shown in FIG. 1 are provided for exemplary purposes only and thus are not limiting. Although a single traffic management device 110, additional traffic management devices may be coupled in series and/or parallel to the traffic management device 110, thereby forming a cluster, depending upon specific applications, and the single traffic management device 110 shown in FIG. 1 is by way of example only, and not by way of limitation. Further, traffic management device 110 can be implemented in a distributed manner as a set of cores executing network processes over a plurality of traffic management devices in a cluster of traffic management devices.

Generally, the traffic management device 110 manages network communications, which may include one or more client requests and server responses, to/from the network 112 between the client computers 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 112, passing through one or more intermediate network devices and/or intermediate networks, until ultimately reaching the traffic management device 110, for example. In addition, as discussed in more detail with reference to FIGS. 2-3, traffic management device 110 is configured to manage server resources. In any case, the traffic management device 110 may manage the network communications by performing several network traffic management related functions involving network communications, secured or unsecured, such as load balancing, access control, VPN hosting, network traffic acceleration, encryption, decryption, cookie and key management a in accordance with the processes described further below in connection with FIGS. 2-3, for example.

Figure 2:
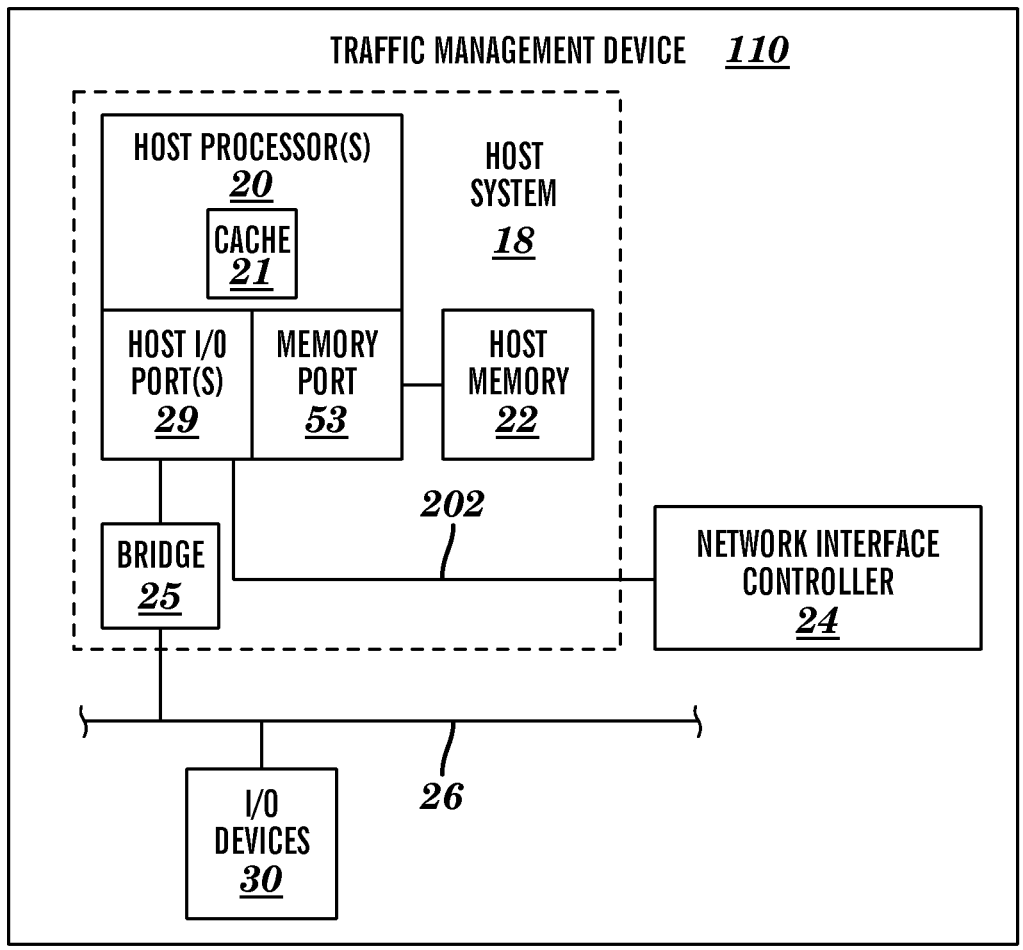
FIG. 2 is a partly schematic and partly functional block diagram of traffic management device in the exemplary network environment of FIG. 1.

FIG. 2 illustrates an example traffic management device 110. Included within the traffic management device 110 is a system bus 26 (also referred to as bus 26) that communicates with a host system 18 via a bridge 25 and with an input-output (I/O) device 30. In this example, a single I/O device 30 is shown to represent any number of I/O devices connected to bus 26. In one example, bridge 25 is in further communication with a host processor 20 via host input output (I/O) ports 29. Host processor 20 can further communicate with a network interface controller 24 via a CPU bus 202, a host memory 22 (via a memory port 53), and a cache memory 21. As outlined above, included within the host processor 20 are host I/O ports 29, memory port 53, and a main processor (not shown separately).

In one example, traffic management device 110 can include the host processor 20 characterized by anyone of the following component configurations: computer readable medium and logic circuits that respond to and process instructions fetched from the host memory 22; a microprocessor unit, such as: those manufactured by Intel Corporation of Santa Clara, Calif.; those manufactured by Motorola Corporation of Schaumburg, IL; those manufactured by Transmeta Corporation of Santa Clara, Calif.; the RS/6000 processor such as those manufactured by International Business Machines of Armonk, N.Y.; a processor such as those manufactured by Advanced Micro Devices of Sunnyvale, Calif.; or any other combination of logic circuits capable of executing the systems and methods described herein. Still other examples of the host processor 20 can include any combination of the following: a microprocessor, a microcontroller, a central processing unit with a single processing core, a central processing unit with two processing cores, or a central processing unit with more than one processing core.

Examples of the traffic management device 110 include one or more application delivery controller devices of the BIG-IP® product family provided by F5 Networks, Inc. of Seattle, Wash., although other types of traffic management devices may be used. In an exemplary structure and/or arrangement, traffic management device 110 can include the host processor 20 that communicates with cache memory 21 via a secondary bus also known as a backside bus, while another example of the traffic management device 110 includes the host processor 20 that communicates with cache memory 21 via the system bus 26. The local system bus 26 can, in some examples, also be used by the host processor 20 to communicate with more than one type of I/O devices 30. In some examples, the local system bus 26 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other example configurations of the traffic management device 110 include I/O device 30 that is a video display (not shown separately) that communicates with the host processor 20 via an Advanced Graphics Port (AGP). Still other versions of the traffic management device 110 include host processor 20 connected to I/O device 30 via any one or more of the following connections: HyperTransport, Rapid I/O, or InfiniBand. Further examples of the traffic management device 110 include a communication connection where the host processor 20 communicates with one I/O device 30 using a local interconnect bus and with a second I/O device (not shown separately) using a direct connection. As described above, included within some examples of the traffic management device 110 is each of host memory 22 and cache memory 21. The cache memory 21, will, in some examples, be any one of the following types of memory: SRAM; BSRAM; or EDRAM. Other examples include cache memory 21 and host memory 22 that can be anyone of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein.

The host memory 22 and/or the cache memory 21 can, in some examples, include one or more memory devices capable of storing data and allowing any storage location to be directly accessed by the host processor 20. Such storage of data can be in a local database. It is to be noted that local database can be optionally located within host memory 22, and the location of the local database is by way of example only, and not by way of limitation. Alternatively, local database may be outside traffic management device 110 and coupled externally via one or more input output ports of network interface controller 24. Examples of local database 204 may include Microsoft Access® database provided by Microsoft Corporation of Redmond, Wash., or an Oracle® database provided by Oracle Corporation of Redwood Shores, Calif., although one of ordinary skill in the art, after reading this disclosure can contemplate other types and numbers of databases, custom built or standardized, which may be used to implement the local database. Further examples of traffic management device 110 include a host processor 20 that can access the host memory 22 via one of either: system bus 26; memory port 53; or any other connection, bus or port that allows the host processor 20 to access host memory 22.

One example of the traffic management device 110 provides support for any one or more of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable compact disk (CD) for GNU/Linux distribution such as KNOPPIX®, a hard-drive or any other device suitable for installing applications or software. Applications can, in some examples, include a client agent, or any portion of a client agent. The traffic management device 110 may further include a storage device (not shown separately) that can be either one or more hard disk drives, or one or more redundant arrays of independent disks; where the storage device is configured to store an operating system, software, programs applications, or at least a portion of the client agent. A further example of the traffic management device 110 includes an installation device that is used as the storage device.

Furthermore, the traffic management device 110 can include network interface controller 24 to communicate, via an input-output port inside network interface controller 24, with a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, optical connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the traffic management device 110 includes network interface controller 24 configured to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface controller 24 can comprise anyone of: a built-in network adapter; a network interface card; a PCMCIA network card; a card bus network adapter; a wireless network adapter; a USB network adapter; a modem; or any other device suitable for interfacing the traffic management device 110 to a network capable of communicating and performing the methods and systems described herein.

In various examples, the traffic management device 110 can include any one of the following I/O devices 30: a keyboard; a pointing device; a mouse; a gesture based remote control device; a biometric device; an audio device; track pads; an optical pen; trackballs; microphones; drawing tablets; video displays; speakers; inkjet printers; laser printers; and dye sublimation printers; or any other input/output device able to perform the methods and systems described herein. Host I/O ports 29 may in some examples connect to multiple I/O devices 30 to control the one or more I/O devices 30. Some examples of the I/O devices 30 may be configured to provide storage or an installation medium, while others may provide a universal serial bus (USB) interface for receiving USB storage devices such as the USB Flash Drive line of devices manufactured by Twintech Industry, Inc. Still other examples of an I/O device 30 may be bridge 25 between the system bus 26 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

Accordingly, components of traffic management device 110 receive one or more requests in a message based protocol. The traffic management device 110 determines a difference between a level of utilization of resources maintained by a server (e.g., one of servers 102(1)-102(n)) that handles the one or more received requests and a threshold level of utilization of resources that can be maintained by the server; and randomly delays the one or more requests based upon the determined difference.

Figure 3:
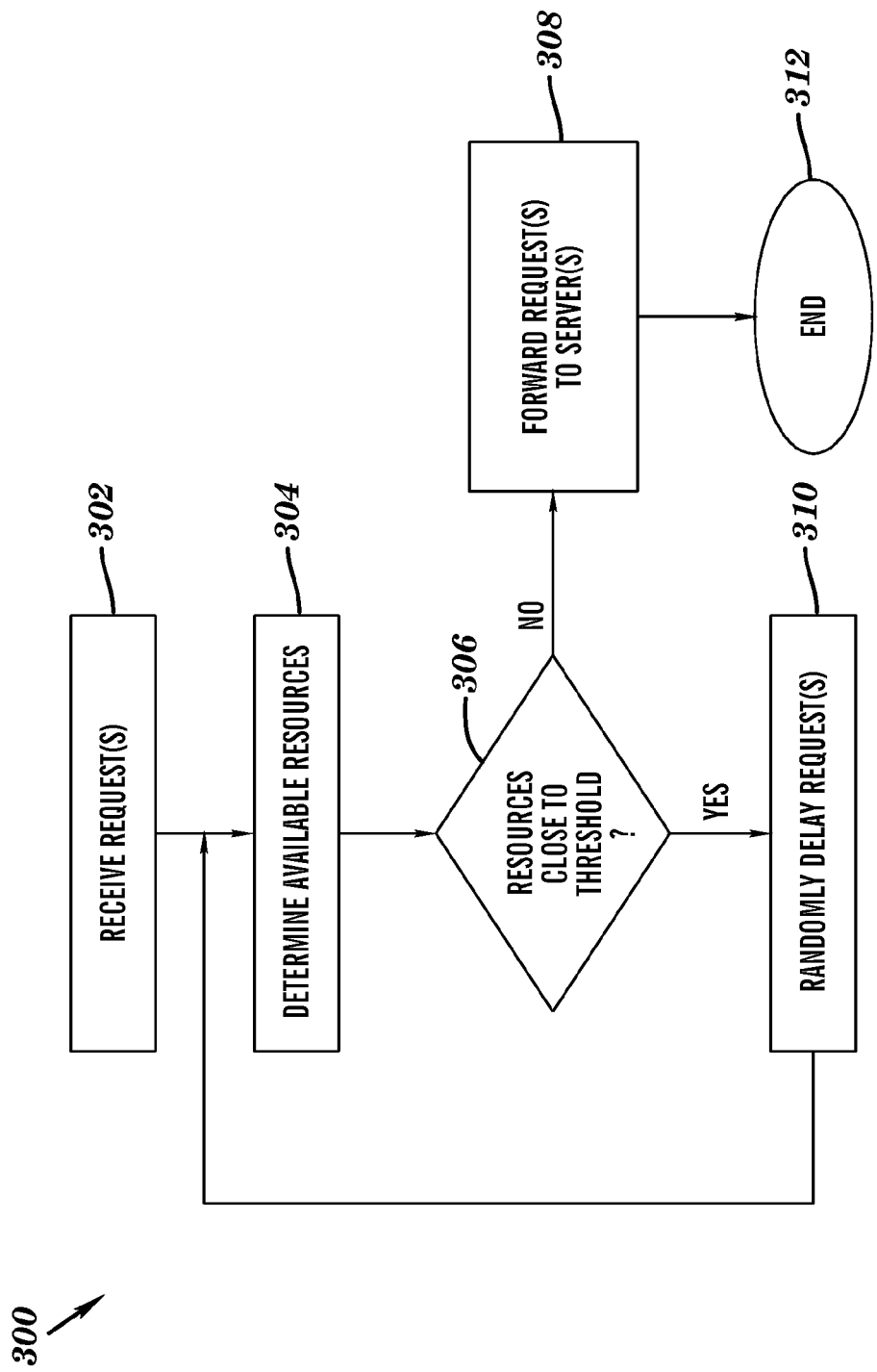
FIG. 3 is a flowchart of an exemplary process and method for managing server resources.

The operation of an example process for random early message request delaying for managing server resources using traffic management device 110 shown in FIGS. 1-2, will now be described with reference back to FIGS. 1-2 in conjunction with a flow diagram or flowchart 300 shown in FIG. 3. The flowchart 300 in FIG. 3 is representative of example machine readable instructions for implementing management of server resources, for example, at the traffic management device 110. In this example, the machine readable instructions comprise an algorithm for execution by: (a) a processor (e.g., host processor 20), (b) a controller, and/or (c) one or more other suitable processing device(s) within host system 18, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the traffic management device 110 could be implemented by software, hardware, and/or firmware. Also, some or all of the machine readable instructions represented by process of the flowchart 300 of FIG. 3 may be implemented manually at the traffic management device 110, for example, using a command line interface (CLI) prompt window. Further, although the example algorithm is described with reference to the flowchart 300 illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Referring now to FIG. 3, in step 302 of the flowchart 300, traffic management device 110 receives one or more requests for network resources from a user at one of the client computers 104(1)-104(n). In this example, the request is an HTTP request at Layer 7 of the Open Systems Interconnection model (OSI model), although the request may be associated with other types of message based protocols, and is not restricted to HTTP only. Further, the one or more requests can be associated with an already executing application hosted by one or more servers 102(1)-102(n) over an existing connection maintained by one or more of servers 102(1)-102(n). Alternatively, the one or more requests may result in a new application to be launched over a new connection maintained by one or more of servers 102(1)-102(n). Furthermore, requests can be for dynamic content, static content, and/or combinations thereof stored on one or more servers 102(1)-102(n) and provided to one or more client computers 104(1)-104(n) via traffic management device 110. In any case, the requests received from one or more client computers 104(1)-104(n) affect resource utilization of servers 102(1)-102(n).

In step 304, upon receipt of request from one of the client computers 104(1)-104(n), traffic management device 110 determines resources available at the particular server in servers 102(1)-102(n) to which the request is to be directed or forwarded for servicing. By way of example only, the resource requested by one of the client computers 104(1)-104(n) can be a request for new connection to one of servers 102(1)-102(n). The determination can involve counting a number of connections supported or maintained by each of servers 102(1)-102(n), although the determination can include other parameters for resource utilization, e.g., number of pending transactions at each of servers 102(1)-102(n) over one or more connections maintained by the servers 102(1)-102(n).

In step 306, traffic management device 110 performs a check whether or not available resources at one of the servers 102(1)-102(n) are close to a threshold level/value of utilization of the resources. This determination can include determining how close the particular server among servers 102(1)-102(n) is to the threshold level and calculating a difference between the threshold value and the actual resource utilization of the server. For example, the server to which the request is to be directed is configured to support a threshold number of connections. Traffic management device 110 determines how far from the threshold number of connections that server is when the request is received by the traffic management device 110. For example, traffic management device 110 analyzes how close to a "no connections available" threshold the pool of servers 102(1)-102(n) managed by traffic management device 110 is, and randomly queues HTTP or other message-based protocol requests from client computers 104(1)-104(n) proportional to the threshold of maximum connection count supported by one or more servers 102(1)-102(n). Similarly, a check for other types of resource utilization parameters (e.g., a pending number transactions for each of client computers 104(1)-104(n) at one or more servers 102(1)-102(n)) may be made.

In step 308, when traffic management device 110 determines the server to which the request is to be forwarded is not close to a threshold level of utilization of resources, traffic management device 110 forwards the request to the particular server for processing and/or servicing.

In step 310 however, when traffic management device 110 determines the server to which the request is to be directed toward is close to a threshold level of resource utilization, traffic management device 110 randomly delays the received one or more requests based upon a difference between the threshold resource utilization level for the server and the actual resource utilization level. Alternatively, the random delaying can be performed based upon a number of requests received in a given time period (or, request rate) for one or more requesting client computers 104(1)-104(n). Therefore, in this alternative scenario, the more aggressive one or more client computers 104(1)-104(n) are in sending requests to the traffic management device 110, the longer those client computers 104(1)-104(n) have to wait for the requests to get serviced, such that the duration of the delay is randomized, as discussed below. In yet another alternative scenario, the randomly delaying can be performed based upon information in the received request. For example and not by way of limitation, the information can include whether the request is for dynamic content or for static content. Depending upon the information, traffic management device 110 can delay requests for dynamic content differently than requests for static content. It is to be noted randomly delaying can be performed based upon other parameters and using other techniques than techniques discussed with respect to flowchart 400. For example, a combination of techniques for randomly delaying may be used which combination includes one or more techniques discussed above and/or other techniques (e.g., depending upon network address information in the received request), as can be contemplated by one of ordinary skill in the art after reading this disclosure.

In one example, when traffic management device 110 determines resource utilization level of servers 102(1)-102(n) to be close to a corresponding threshold level/value of utilization, the one or more requests are queued at the traffic management device 110 for random periods of time. By way of example only, randomization can be performed by using a pseudo-random number generator that allocates a probability of delaying for a particular request based upon the generated value of the pseudo random number, as discussed with respect to FIG. 4. The pseudo random number generator can be implemented in hardware, software, or combinations thereof, and can be a part of host processor 20. Further, for each one of the one or more requests, target probability values can be allocated and when the probability determined by the pseudo random number generator exceeds the target probability, the request can be delayed. It is to be noted although requests are delayed, they are never dropped and are instead queued at the traffic management device 110 (e.g., in cache memory 21 and/or host memory 22).

The flow then proceeds back to step 304 and the process of flowchart 300 is repeated as long as there are pending requests from client computers 104(1)-104(n) at the traffic management device 110. In step 312, the flow ends.

Figure 4:
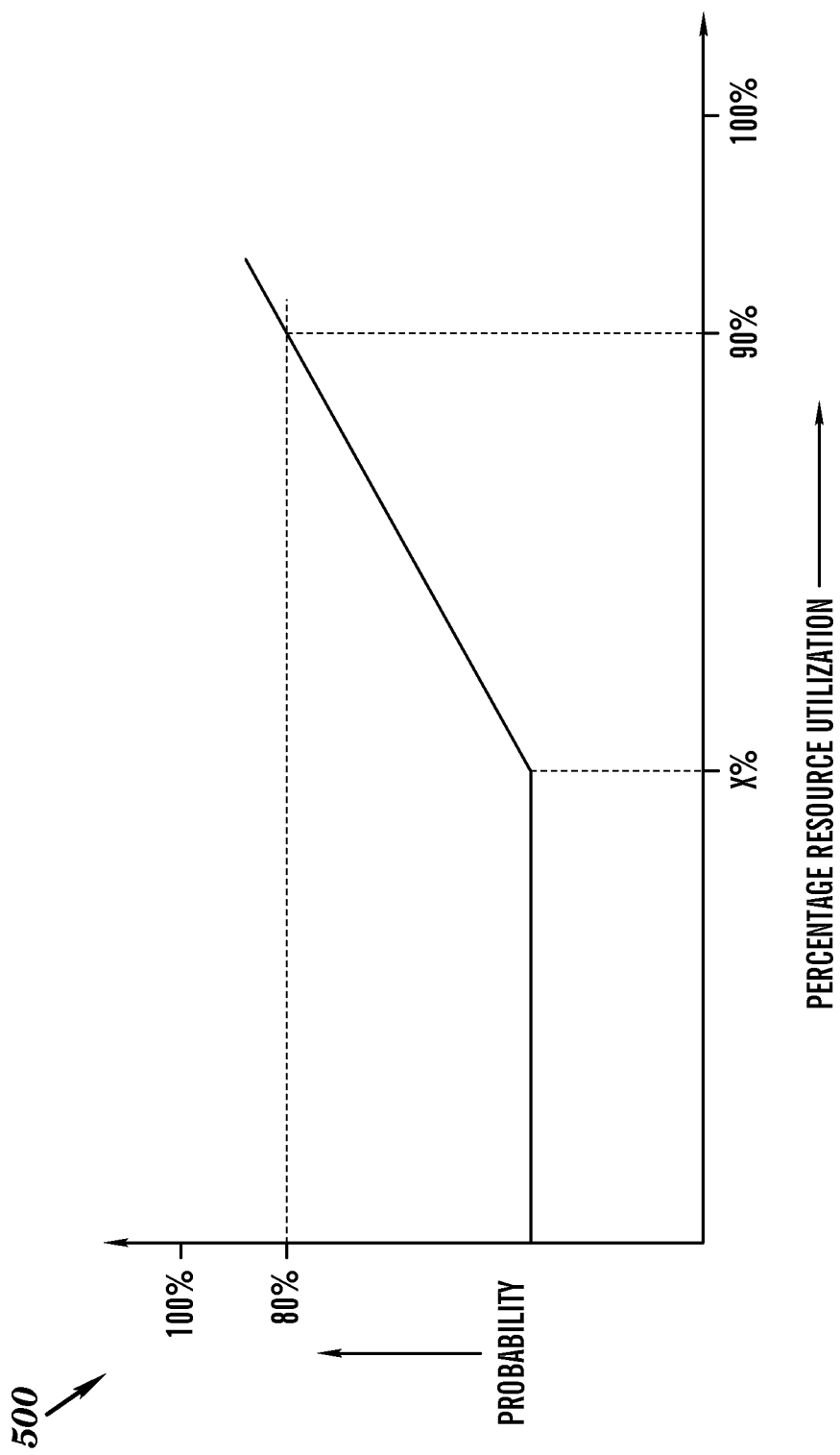
FIG. 4 illustrates an exemplary probability distribution used for managing server resources by randomly delaying network requests.

Referring now to FIG. 4, an exemplary plot 500 showing a probability of delaying versus a percentage utilization of resources by a server is illustrated, which probability is used to randomly delay requests received at traffic management device 110, as discussed in flowchart 300. In plot 500, for up to an X % of resource utilization, there is 0% or no chance of delaying the received requests since servers 102(1)-102(n) are far from their respective resource utilization threshold levels/values. The value of X can be programmed based upon varying network load conditions and resource availabilities of servers 102(1)-102(n), although the value of X may be based on other parameters (e.g., a number of servers that are active), as can be contemplated by those of ordinary skill in the art after reading this disclosure. By way of example only, the value of X can be 75%. In the example plot 500, when server resource utilization is at a 90% level, a received request from client computers 104(1)-104(n) has an 80% probability of getting delayed, although other percentage values may be used depending upon specific design criteria, as can be contemplated by one of ordinary skill in the art reading this disclosure. As discussed above with respect to flowchart 300, the probability level associated with each request can be calculated based upon a pseudo random number generator, and a target probability level can be calculated for each request exceeding which target probability level, the request is randomly delayed. Similarly, when server resource utilization is close to 100%, requests from client computers substantially have a 100% chance of being delayed for a random period of time determined based upon parameters discussed in flowchart 400 of FIG. 4. Further, which message based protocol requests are delayed and which are not can also be selected randomly for delaying using techniques for randomization discussed in the flowchart 400 of FIG. 4. In one example, new requests from client computers 104(1)-104(n) can be prioritized with respect to pending requests already being serviced by one or more of servers 102(1)-102(n). Further, as illustrated in the plot 500, as utilization of resources at servers 102(1)-102(n) increases, the probability or chances of a requests being delayed increase proportionally with requests themselves being selected for random delaying based upon the probability allotted, as shown by way of example in plot 500. It is to be noted although a linear variation in the chances of delaying with respect to utilization of resources is illustrated in plot 500, other types of non-linear variations (e.g., logarithmic) may be used depending upon specific applications.

Having thus described the basic concepts, it will be rather apparent to those skilled in the art that the foregoing detailed disclosure is intended to be presented by way of example only and is not limiting. Various alterations, improvements, and modifications will occur and are intended to those skilled in the art, though not expressly stated herein. The order that the measures and processes for providing secure application delivery are implemented can also be altered. Furthermore, multiple networks in addition to network 112 and LAN 114 could be associated with traffic management device 110 from/to which network packets can be received/transmitted, respectively. These alterations, improvements, and modifications are intended to be suggested by this disclosure, and are within the spirit and scope of the examples. Additionally, the recited order of processing elements or sequences, or the use of numbers, letters, or other designations therefore, is not intended to limit the claimed processes and methods to any order except as can be specified in the claims.

What is claimed is:

1. A method for managing server resources, comprising:
    receiving at a traffic management device one or more requests in a message based protocol;
    determining at the traffic management device a difference between a level of utilization of resources maintained by a server that handles the one or more received requests and a threshold level of utilization of resources that can be maintained by the server; and
    randomly delaying at the traffic management device transmission of the received one or more requests based upon the determined difference between the level of utilization of resources and the threshold level of utilization of resources.

2. The method as set forth in claim 1, wherein the message based protocol is a Hyper-Text Transfer Protocol (HTTP).

3. The method as set forth in claim 1, wherein the randomly delaying is performed proportionally to the difference.

4. The method as set forth in claim 1, wherein at least one of the one or more requests that is newer than at least one of a remaining one or more requests is prioritized for a delivery to the server.

5. The method as set forth in claim 1, wherein the randomly delaying comprises queuing the one or more requests at the traffic management device.

6. The method as set forth in claim 1, wherein the determining comprises determining a probability of delaying the one or more requests using a pseudo random number generator, and wherein the randomly delaying is performed based upon the determined probability.

7. The method as set forth in claim 6, wherein the randomly delaying is performed based upon a comparison of a target probability value for the one or more requests calculated based upon a pseudo random number generator and the determined probability value, such that the one or more requests are delayed only when the determined probability value exceeds the target probability value.

8. The method as set forth in claim 1, wherein the message based protocol is an application layer protocol.

9. The method as set forth in claim 1 further comprising:
    forwarding the one or more requests to the server over one or more of the connections maintained by the server after the delaying is over.

10. The method as set forth in claim 1, wherein the level of utilization of resources is indicated by at least one of a number of connections maintained by the server or a number of pending transactions on at least one connection maintained by the server.

11. The method as set forth in claim 1, wherein the randomly delaying is performed partly based upon at least one of a number of requests per unit time from one or more client computers or information in the new request.

12. A non-transitory computer readable medium having stored thereon instructions for managing server resources comprising machine executable code which when executed by at least one processor, causes the processor to perform steps comprising:
    receiving one or more requests in a message based protocol;
    determining a difference between a level of utilization of resources maintained by a server that handles the one or more received requests and a threshold level of utilization of resources that can be maintained by the server; and
    randomly delaying transmission of the received one or more requests based upon the determined difference between the level of utilization of resources and the threshold level of utilization of resources.

13. The medium as set forth in claim 12, wherein the message based protocol is a Hyper-Text Transfer Protocol (HTTP).

14. The medium as set forth in claim 12, wherein the randomly delaying is performed proportionally to the difference.

15. The medium as set forth in claim 12, wherein at least one of the one or more requests that is newer than at least one of a remaining one or more requests is prioritized for a delivery to the server.

16. The medium as set forth in claim 12, wherein the randomly delaying comprises queuing the one or more requests.

17. The medium as set forth in claim 12, wherein the determining comprises determining a probability of delaying the one or more requests using a pseudo random number generator, and wherein the randomly delaying is performed based upon the determined probability.

18. The medium as set forth in claim 17, wherein the randomly delaying is performed based upon a comparison of a target probability value for the one or more requests calculated based upon a pseudo random number generator and the determined probability value, such that the one or more requests are delayed only when the determined probability value exceeds the target probability value.

19. The medium as set forth in claim 12, wherein the message based protocol is an application layer protocol.

20. The medium as set forth in claim 12, wherein the machine executable code which when executed by the at least one processor, causes the processor to perform steps further comprising:
forwarding the one or more requests to the server over one or more of the connections maintained by the server after the delaying is over.

21. The medium as set forth in claim 12, wherein the level of utilization of resources is indicated by at least one of a number of connections maintained by the server or a number of pending transactions on at least one connection maintained by the server.

22. The medium as set forth in claim 12, wherein the randomly delaying is performed partly based upon at least one of a number of requests per unit time from one or more client computers or information in the new request.

23. A traffic management device comprising:
A processor and a memory coupled to the processor, and wherein the processor is configured to execute programmed instructions stored in the memory to perform steps comprising:
receiving one or more requests in a message based protocol;
determining a difference between a level of utilization of resources maintained by a server that handles the one or more received requests and a threshold level of utilization of resources that can be maintained by the server; and
randomly delaying transmission of the received one or more requests based upon the determined difference between the level of utilization of resources and the threshold level of utilization of resources.

24. The device as set forth in claim 23 wherein the message based protocol is a Hyper-Text Transfer Protocol (HTTP).

25. The device as set forth in claim 23 wherein the randomly delaying is performed proportionally to the difference.

26. The device as set forth in claim 23 wherein at least one of the one or more requests that is newer than at least one of a remaining one or more requests is prioritized for a delivery to the server.

27. The device as set forth in claim 23 wherein the randomly delaying comprises queuing the one or more requests.

28. The device as set forth in claim 23 wherein the determining comprises determining a probability of delaying the one or more requests using a pseudo random number generator, and wherein the randomly delaying is performed based upon the determined probability.

29. The device as set forth in claim 28 wherein the randomly delaying is performed based upon a comparison of a target probability value for the one or more requests calculated based upon a pseudo random number generator and the determined probability value, such that the one or more requests are delayed only when the determined probability value exceeds the target probability value.

30. The device as set forth in claim 23 wherein the message based protocol is an application layer protocol.

31. The device as set forth in claim 23 wherein the A processor and a memory coupled to the processor, and wherein the processor is configured to execute programmed instructions stored in the memory to perform steps comprising: forwarding the one or more requests to the server over one or more of the connections maintained by the server after the delaying is over.

32. The device as set forth in claim 23 wherein the level of utilization of resources is indicated by at least one of a number of connections maintained by the server or a number of pending transactions on at least one connection maintained by the server.

33. The device as set forth in claim 23 wherein the randomly delaying is performed partly based upon at least one of a number of requests per unit time from one or more client computers or information in the new request.

* * * * *